United States Patent [19]

Wolff

[11] Patent Number: 4,752,512
[45] Date of Patent: Jun. 21, 1988

[54] PROCESS FOR THE MANUFACTURE OF SCREEN COMPONENTS OF VARIOUS LENGTHS FOR SYSTEM SCREENING DECKS AND SCREEN COMPONENT

[75] Inventor: Kurt Wolff, Dinslaken, Fed. Rep. of Germany

[73] Assignee: Steinhaus GmbH, Mulheim, Fed. Rep. of Germany

[21] Appl. No.: 942,157

[22] Filed: Dec. 16, 1986

[30] Foreign Application Priority Data

Dec. 18, 1985 [DE] Fed. Rep. of Germany ....... 3544752

[51] Int. Cl.$^4$ ................................................ B32B 3/02
[52] U.S. Cl. ........................................ 428/58; 52/633;
156/155; 156/267; 156/304.5; 156/304.6;
428/61; 428/138
[58] Field of Search ................... 156/155, 304.3, 304.5,
156/304.6, 267, 309.6; 428/58, 61, 138; 52/633

[56] References Cited

U.S. PATENT DOCUMENTS 4,239,574 12/1980 Aust et al. ........................... 156/267

Primary Examiner—Robert A. Dawson
Attorney, Agent, or Firm—Pollock, Vande Sande and Priddy

[57] ABSTRACT

The subject matter of the application is based on a process for the manufacture of screen components of various lengths for system screening decks, the screen components having substantially the form of a plate or at least a frame with longitudinal and transverse members. The screen components consist of a weldable plastic and are subdivided into short components with a square and/or rectangular basic shape and into long components two or three times the length of this basic shape. The screen components have in each case, on supporting members arranged on both longitudinal sides, fastening elements, which project from the undersides, or edge fastening recesses spaced in a certain pitch independently of their lengths. In spite of their various lengths, such screen components are to be manufactured in injection-moulded quality, for which only one injection mould in a single format corresponding to the basic shape is necessary. For this, the screen components are first produced as blanks in the basic shape, with an allowance on their sides running transverse to the support, and, from the blanks, the short components are manufactured by cutting off the allowance and the long components are manufactured by butt welding at the transverse sides and melting off the allowance.

4 Claims, 1 Drawing Sheet

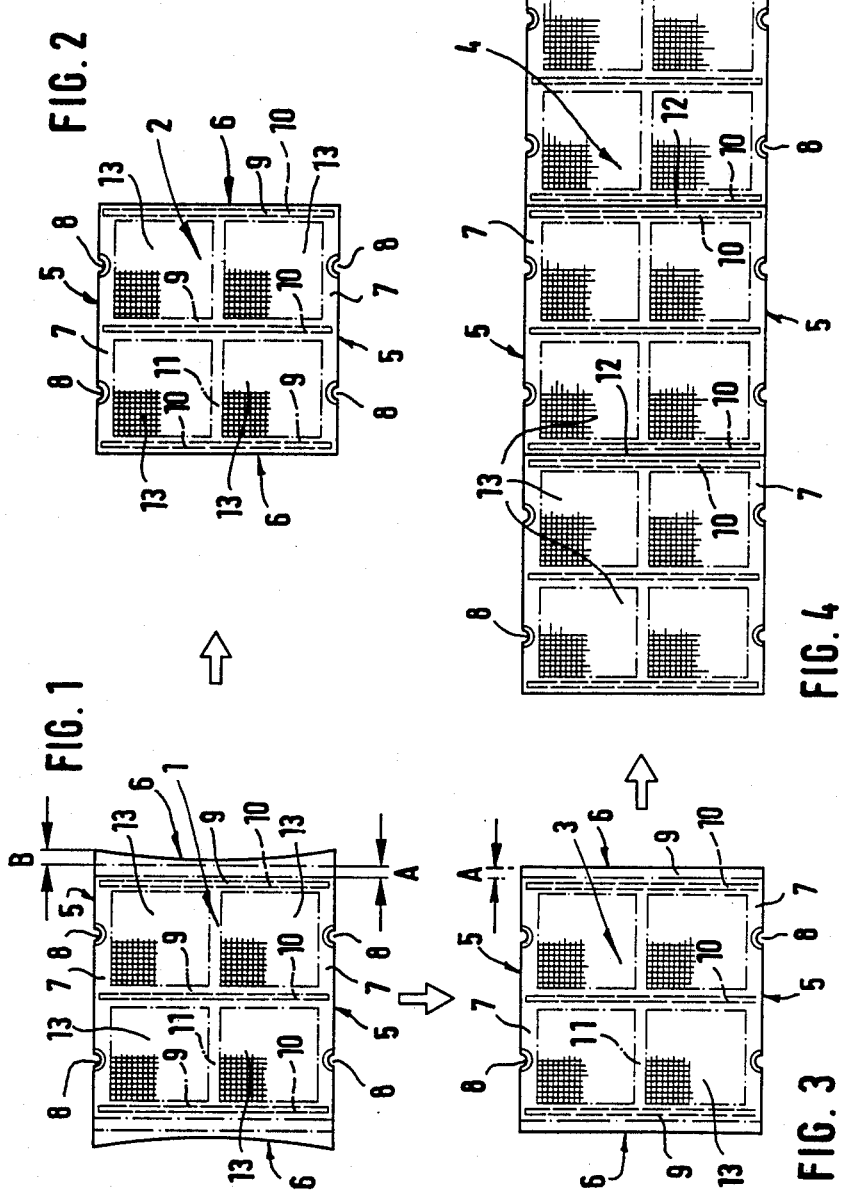

PROCESS FOR THE MANUFACTURE OF SCREEN COMPONENTS OF VARIOUS LENGTHS FOR SYSTEM SCREENING DECKS AND SCREEN COMPONENT

BACKGROUND OF THE INVENTION

The invention relates to a process for the manufacture of screen components of various lengths for system screening decks that are fabricated of a weldable plastic material subdivided into short components having a square or rectangular basic shape, and long components whose length is two or more times that of said basic shape, each screen component including supporting members that are provided with fastening elements or fastening recesses.

It is known to manufacture such screen components for system screening decks by the open casting process. In this process, liquid plastic is filled from above into open moulds, manual or mechanical casting devices being used and the casting material being processed under atmospheric pressure. The reusable open moulds are of relatively simple design, and their dimensions correspond to the short and long components.

Furthermore, it is known to manufacture such screen components by the injection moulding process, the liquid plastics material being pressed into a closed injection mould under pressure. Injection moulds, which have to be separable for removal of the finished workpiece, require runners and venting channels and must be adapted to the particular injection moulding machine, are many times more expensive than the moulds open on one side which are necessary for the open casting process. Since here too a separate mould is required for each size of screen component, it is endeavoured to keep down the number of screen components of different lengths, to reduce accordingly the expenditure on injection moulds. In addition, 2½ times the length of a square basic shape of the screen components is not exceeded, as the amounts injected and clamping forces of the injection moulding machines usually used are insufficient for screen components which are any longer.

The present invention in contrast to the foregoing, provides a process of generic type by which the screen components can be manufactured in various lengths of injection-moulded quality for which only one injection mould of a single format corresponding to the basic shape and a relatively small injection moulding machine are necessary.

It is known in principle, from German Utility Model No. 6,915,606, to manufacture a plate screening deck or a screening mat of prefabricated screen mouldings or individual plates welded to one another. In this prior art arrangement, the screen mouldings are already connected to one another by a butt welding process, a welding being provided both on the longitudinal sides and on the transverse sides of the screening mouldings. However, welded screening mats are not intended or suitable for use in system screening decks; in particular, the prior art arrangement has no concern with the problem of maintaining a specified modular dimension with scree components of various lengths and also of safeguarding a constant, in each case system-dependent pitch of the fastening elements to the screen components. Furthermore, only screen components of the same format are ever used, so that there is no need for a distinction between short components and long components. By the known method, therefore, the scree components can be welded to one another straight away as blanks.

SUMMARY OF THE INVENTION

The special advantage of the process according to the present invention lies in the fact that screen components of various lengths and of uniform quality can be manufactured by the injection moulding process with a minimum of expenditure on the injection moulds. This is so since the quality advantages which the smaller dimensions already lend the short components are inevitably also encountered with the long components and, unlike in the manufacture of long components in a separate injection mould provided for the purpose, there is no risk that the hole spacings and the hole widths at one place are different from those in the remaining regions of the long components. Thus, a high degree of uniformity of the screening zones is also attained in the case of the long components.

With the new process, not only is a part of the enormous mould costs saved for the manufacture of the long components by the injecting moulding process, but the remaining manufacturing expenditure is also less. This is so since a large injection moulding machine with a large injection volume and great clamping force had to be used for the production of the long components and operation had to be at high injection pressures to be able to fill out of the long moulds with the liquid plastics as free from voids as possible and as simultaneously as possible at all points. This increases injection moulding costs quite considerably. This does not apply in the case of the process according to the invention because it manages with the small format of the basic shape and with relatively small injection machines.

Furthermore, the screen component blanks manufactured in accordance with the process according to the invention offer the advantage of simplified stock-keeping, since, if need be, short components and/or long components can be produced from them and made available immediately. Above all, there is no need to keep ready screen components of various lengths.

Finally, screen components of considerable length can be manufactured by the new process, which may even be, for example, five times the basic shape. Until now, the long components manufactured as one piece by the injection moulding process have had a maximum length of 2½ times the square basic shape; the injection moulding process cannot manage with reasonable expenditure longer components as elements manufactured in one piece. The long components which can be manufactured much longer according to the invention make it possible to reduce the number of joints in a system screening deck. This is particularly notable if the screen fields of screen components have small gap widths, since then the joints must be very close in order not to let through a grain which is larger than the grain passing through the gap width concerned. In critical cases, special seals are placed between the abutting faces of the scree components, and this is another aspect where the expenditure is reduced in the use of lengthy long components.

As far as the possible reinforcement of the screen components is concerned, the expenditure on preparation and material can be reduced if the reinforcement is dispensed with, at least in the case of the longitudinal members, which lie between the mutually parallel supporting members. When the plastic sets, the screen components therefore shrink in the region of the unreinforced longitudinal members, and a concave indentation occurs on the sides of the screen components lying transverse to the longitudinal members. Therefore, in such cases, the blanks are preferably produced with an additional shrinkage excess, which must in any event be cut off, in other words even if the allowance on the transverse sides of the screen components, necessary for the welding operation, is to remain. In spite of the omitted longitudinal reinforcement in the centre region of the screen components, straight transverse sides are then obtained, which is important for an even melt removal of the excess provided for the welding operation. This ensures the dimensional stability of long components without central reinforcement in the longitudinal direction.

For the manufacture of the short components and the long components, it is expedient to use blanks which have at least one reinforcement, in particular a reinforcing rod, in both of their outer-lying transverse members, which run perpendicular to the supporting members. When welding such blanks, two reinforcements then lie alongside each other on the transverse side, parallel to the weld, in the members connected to each other. This is of particular advantage because all experience shows that the long components are loaded more in their central regions than towards the outer-lying transverse members. Without any additional measures, a strengthened reinforcement is obtained at precisely those points at which it is needed on account of higher loading.

BRIEF DESCRIPTION OF THE DRAWINGS

The invention is described in more detail below for exemplary embodiments and with reference to the drawing, in which:

FIG. 1 shows the plan view of a blank for the manufacture of screen components of various lengths, FIG. 2 shows the plan view of a short component manufactured from the blank according to FIG. 1, FIG. 3 shows the plan view of a component manufactured from the blank according to FIG. 1, with allowance on the transverse side before welding, and FIG. 4 shows the plan view of a long component welded together from three components according to FIG. 3.

DESCRIPTION OF THE PREFERRED EMBODIMENTS

FIG. 1 shows a blank 1 for the manufacture of screeb components of various lengths, this blank 1 already having all the features of the short components 2 (FIG. 2) and long components 4 (FIG. 4) to be manufactured from it, with the exception of the design of its transverse sides 6. Therefore, the blank 1 already has a square or a rectangular (not shown) basic shape, a distinction being made between mutually opposite longitudinal sides 5 and the transverse sides 6, because on the longitudinal sides 5 lie supporting members 7 which, both in the case of the short component 2 and in the case of the long component 4, lie in the longitudinal direction of the support struts of a substructure. In the region of the supporting members 7 on the longitudinal sides, the blank 1 has fastening elements 8 in the form of fastening projections, which protrude from the underside, or edge recesses, via which the fastening of the finished screen component on the substructure mentioned is performed.

Between the supporting members 7 extend transverse members 9, into which is embedded a reinforcement 10, for example in the form of a steel rod. In the longitudinal direction, centrally between the supporting members 7, lies another longitudinal member 11, which does not have a reinforcement.

The blank 1 and, correspondingly, the screen components 2 and 4 have fields 13 which are delimited by the transverse members 9 and the longitudinal members 7 and 11 and in the region of which are the screen openings. Fields 13 may be manufactured in one piece, with the other members 7, 9 and 11, by the injection moulding process, or, alternatively, fields 13 may be inserted subsequently into a frame formed by these members. In addition, the screen components 2 and 4, and the corresponding blanks 1, also include what are called blind components, which do not have screen openings and are used at particularly loaded points or at border zones of the system screening deck concerned.

Compared with the short component 2 represented in FIG. 2, the screen component blank 1 has on the transverse sides 6 an inner allowance A and an outer shrinkage excess B. The shrinkage excess B is provided because a shrinkage occurs in the longitudinal direction in the region of the unreinforced central member 11 during setting of the plastics material after injection moulding of the blank 1, so that the transverse sides 6 of the blank 1 constrict concavely inwards. In the representation of FIG. 1, this has been exaggerated, while the slight curvature of the hole zones and of the reinforcements occurring in the outer regions is not shown. In the case of a blank which has in basic shape dimensions of 300×300 mm, this shrinkage in the centre of the transverse sides 6 may however be on the order to magnitude of 0.5 to 1 mm, therefore the transverse sides 6 have to be subsequently strengthened.

If a short component 2 is produced corresponding to FIG. 2 from the blank 1 according to FIG. 1, both the shrinkage excess B and the allowance A are removed in one operation by machining, for example cutting off. Thereafter, the longitudinal sides 5 and the transverse sides 6 of the individual component 2 are of equal length.

The blank 1 according to FIG. 1 may also be used, however, to manufacture long components 4 in accordance with FIG. 4, for which first the shrinkage excess B is removed by machining, so that the transverse sides 6 of the blank 1, on which the allowance A remains as before, are merely strengthened. FIG. 3 shows such a strengthened component 3, here the still remaining allowance A on the transverse sides 6 corresponding to the allowance A in accordance with FIG. 1, and on the same scale. The longitudinal components 4 in accordance with FIG. 4 are then welded together from several components 3, which is performed by means of butt welding in the region of the transverse sides 6 which finish alongside each other. This produces welds 12 lying transverse to the longitudinal sides 5, at which the melted-off plastics material of the allowance A initially forms a surrounding ridge which is removed by machining. This material loss brought about by the welding operation can be predetermined so exactly by means of an exact width of the allowance A that in butt yielding by means of a suitable electrode bar, the dimensional stability of long component 4 in the longitudinal direction is so exact that the fastening elements 8 on the longitudinal sides 5 maintain a specified pitch even over the welds 12.

In the regions of the welds 12, the long components 4 have a double reinforcement 10, since the joined components 3 (FIG. 3) have a reinforcement 10 in each of their transverse members 9 lying alongside each other at the welds 12, so that all in all the long components 4 are particularly strengthened in the region of the welds 12.

In the case of the short components 2 as well as in the case of the long components 4 the sides 6 running transverse to the support are strengthened by cutting off the allowance A, whereby side abutting ends are formed, which at these transeverse sides 6 are directed exactly rectangular to the longitudinal sides 5 and lying in a vertical plane to the screen component plane. The short as well as the long screen coponents are closely buttable together with these side abutting ends. There by is avoided that the material to be screened can ingress into gaps between the side abutting ends of adjacent screen components.

I claim:

1. Process for the manufacture of screen components of various lengths for systems screening decks, the screen components having substantially the form of a plate or at least a frame with longitudinal and transverse members, consisting of a weldable plastic subdivided into short components with a square and/or rectangular basic shape and into long components two or more times the length of this basic shape, having on supporting members and arranged on both longitudinal sides, fastening elements, which project from the undersides, or edge fastening recesses spaced in a certain pitch independently of their length, characterized in that the screen components are first produced as blanks (1) in the basic shape with an allowance (A) on the sides thereof running transverse to the supporting members, and, from the blanks (1), the short components (2) are manufactured by cutting off the allowance (A), and the long components (4) are manufactured by butt welding on the transverse sides (6) whereby the allowance (A) is melted to form a ridge which is then cut off.

2. Process according to claim 1, the screen components having a reinforcement only in the transverse direction apart from the supporting members, characterized in that the blanks (1) are produced, in addition to the allowance (A), with a shrinkage excess (B) on the transverse sides, and the short components (2) are manufactured by cutting off the allowance (A) and the shrinkage excess (B), and only the shrinkage excess (B) is cut off from the blanks (1) used for the long components (4) before the butt welding thereof.

3. Screen component manufactured in accordance with the process according to claim 2, characterized in that starting from blank (1), which has at least one reinforcement (10) at least in each of its two outer-lying transverse members (9), the long components (4) each have a double transverse reinforcement (10) at the welds (12).

4. Screen component, manufactured in accordance with the process according to claim 1, characterized in that the short components (2) as well as the long components (4) are strengthened by cutting off the allowance (A) on the sides (6) running transverse to the supporting members and have side abutting ends which are closely buttable together.

* * * * *